United States Patent [19]

Fruhauf et al.

[11] Patent Number: 4,932,053
[45] Date of Patent: Jun. 5, 1990

[54] SAFETY DEVICE AGAINST THE UNAUTHORIZED DETECTION OF PROTECTED DATA

[75] Inventors: Serge Fruhauf, Peynier; Laurent Sourgen, Aix en Provence, both of France

[73] Assignee: SGS-Thomson Microelectronics, S.A., Gentilly, France

[21] Appl. No.: 431,534

[22] Filed: Nov. 3, 1989

[30] Foreign Application Priority Data

Nov. 10, 1988 [FR] France ................... 88 14707

[51] Int. Cl.⁵ .............................................. H04L 9/00
[52] U.S. Cl. ........................................ 380/4; 380/6; 380/50; 380/24; 365/49; 365/120; 235/379; 235/380
[58] Field of Search ............ 364/200, 900, 222.5, 364/246.6, 260.81, 286.4, 286.5, 286.6, 918.7, 943.7, 947.4, 958.2, 966, 969, 969.4, 969.3, 971.1; 380/3, 4, 6, 8, 9, 50, 23, 24; 365/49, 53, 120; 235/379, 380

[56] References Cited

U.S. PATENT DOCUMENTS 4,723,224  2/1988  Van Hulett et al. ................. 365/49

FOREIGN PATENT DOCUMENTS 0269468  6/1988  European Pat. Off. .
0279712  8/1988  European Pat. Off. .

*Primary Examiner*—Stephen C. Buczinski
*Assistant Examiner*—Bernarr Earl Gregory
*Attorney, Agent, or Firm*—Roland Plottel

[57] ABSTRACT

The disclosure concerns the safety of the confidential information contained in integrated circuits. In a certain number of integrated circuit applications and, more particularly, in the circuits contained in cards known as "chip cards", it is necessary to prohibit access by unauthorized persons to confidential information stored in a memory of the circuit. To prevent the fraudulent practice of examining the current consumption at the terminals of the integrated circuit during an operation of reading or writing in the memory, a protection circuit is used. This protection circuit actuates the simulation, according to a pseudo-random sequence generated by a generator, of current consumption values identical to those of real memory cells.

9 Claims, 3 Drawing Sheets

FIG_1

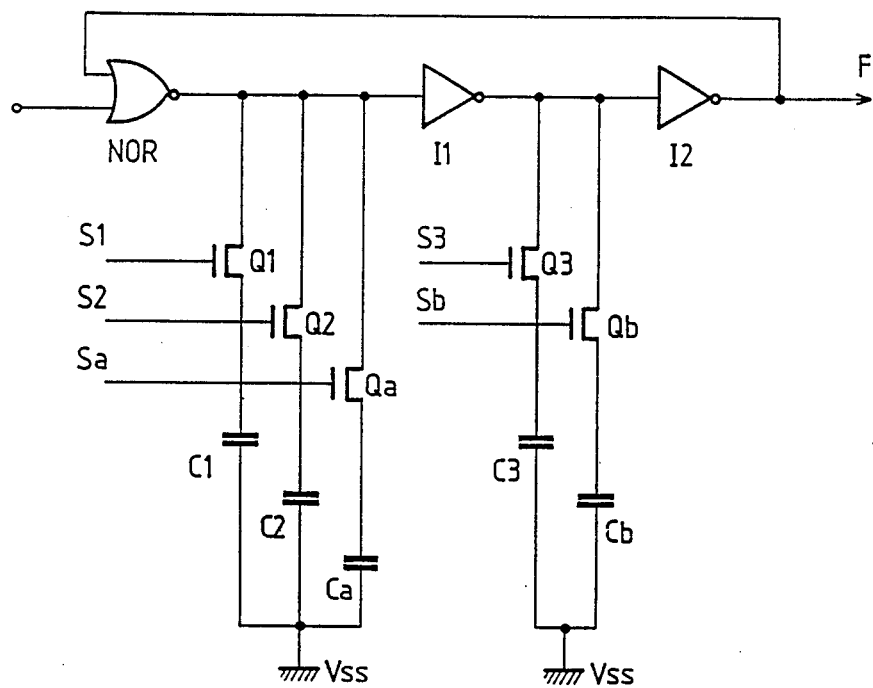
FIG_4

SAFETY DEVICE AGAINST THE UNAUTHORIZED DETECTION OF PROTECTED DATA

BACKGROUND OF THE INVENTION

1. Field of the Invention

The invention concerns the safety of confidential information contained in integrated circuits.

2. Description of the Prior Art

In a certain number of integrated circuit applications and, more particularly, in the circuits contained in cards known as "chip cards", it is necessary to prohibit access by unauthorized persons to confidential information stored in a memory of the circuit.

This confidential information is stored, for example, in read-only memories (ROMs) or else in electrically programmable non-volatile read-only memories (EPROMs or EEPROMs).

Of course, for this information to be truly inaccessible, the data recorded in the memory should not be given at the input-output terminals of the integrated circuit. In practice, it has therefore been provided that, when the degree of confidentiality is especially high, the confidential information is processed by a microprocessor contained in the same integrated circuit as the memory. Thus, the information circulates within the integrated circuit, between the microprocessor and the memory, but it does not reach the external terminals of access to the integrated circuit. This precaution may concern the reading of the information: this information is read and exploited by a microprocessor which will not transmit them to the exterior. It may also concern the writing of information in the memory in the case of electrically programmable memories: a microprocessor writes pieces of information that it has itself determined, the mode of determination being unknown to the user, and at no time do the written pieces of information appear at the external terminals.

It was observed, however, that it was possible to gain access, at least partially, to the content of the memory in a roundabout way which would consist in measuring the current consumed by the integrated circuit during an operation for reading the memory or a writing operation.

In fact, the operation for reading a 0 bit does not consume the same amount of current as the operation for reading a 1 bit. The same applies to the writing operation. If the memory is read or written in eight-bit words, the difference between the reading (or writing) of eight 0 bits and the reading (or writing) of eight 1 bits is even greater than that of one bit.

For example, the reading of one memory bit may consume 200 microamperes for a 1 bit, and no current for a 0 bit in the case of a read-only memory encoded by the presence or absence of a transistor at the address of the bit considered. Similar examples may be given for EPROMs or EEPROMs in both reading and writing. Consequently, it is possible to partially or totally decipher the confidential content of a memory by observing the current consumed during the reading or writing of this memory. A user with fraudulent intent could measure the current consumed between the general supply terminals (necessarily accessible outside the integrated circuit).

As an example of possible fraudulent behavior in the reading of confidential information: it is possible to read a confidential programme stored in a read-only memory in the integrated circuit, or a confidential enabling code stored in an electrically programmable memory of the circuit.

Another example of fraud, this time concerning the writing and not the reading of confidential information, would be the following one: in certain protected circuits, there is provision for the user to introduce an enabling code through a keyboard whenever he wishes to use the circuit. To prevent fraud involving all the systematic introduction of every possible code, there is provision for storing an error bit in the memory whenever a wrong code is introduced. At the end of three errors, the three error bits trigger a block in the working of the circuit. But, here again, it is possible to detect the consumption of the current and to deduce therefrom that an error bit is being stored; this knowledge would be used to very swiftly interrupt the memorizing of the error bit, thus annihilating the protection that relies on the possibility of storing three error bits without the user's being aware of it, when there is a successive introduction of wrong codes.

The present invention seeks to prevent these possibilities of fraudulent behaviour, chiefly in the reading but also, as the case may be, in the writing of confidential information.

SUMMARY OF THE INVENTION

The invention proposes a circuit for the protection of confidential data of a memory in integrated circuit form, said protection circuit comprising, on the same integrated circuit, several simulation cells capable of being controlled individually, these cells having two current consumption states that differ according to the signal that controls them, and a generator of pseudo-random sequences to control these cells, so that each of them is, pseudo-randomly, in one state or in another, thus making it more difficult to determine confidential information by reading the overall current consumption of the integrated circuit.

The consumption read from the external terminals of the circuit will, in effect, be the superimposition of the real consumption of the memory cells and the pseudo-random consumption of the cells of the protection circuit.

Preferably, the cells, which shall hereinafter be called simulation cells, are built in such a way that, in their two states, they consume currents substantially equal to those of the memory cells. The first state corresponds to the consumption for a 0 bit of the memory and the second state would correspond to the consumption for a 1 bit. Thus, the detection is even more difficult.

Depending on whether the memory has to be protected with respect to a reading of the stored information, or with respect to a detection of the information being written in the memory, the simulation cells will evidently be built differently, for the current consumption values are not identical in reading and in writing.

In the case of a system of protection against reading, the cell could consist of a transistor identical to the transistors forming the memory cells. In the case of a system of protection against the detection of information during writing, the cell could be formed by a floating gate transistor, the floating gate and the control gate of which will be short-circuited.

The pseudo-random generator could be made in a standard way by a series of cascade-mounted flip-flops, the outputs of certain flip-flops being looped back to the inputs of other flip-flops through OR-Exclusive gates.

The random character may again be reinforced by the random variation of the clock frequency which controls these flip-flops.

BRIEF DESCRIPTION OF THE DRAWINGS

Other characteristics and advantages of the invention will appear from the reading of the following detailed description, made with reference to the appended drawings, of which:

FIG. 4 is a detailed diagram of the oscillator of FIG. 3.

DESCRIPTION OF PREFERRED EMBODIMENTS

Figure 1:
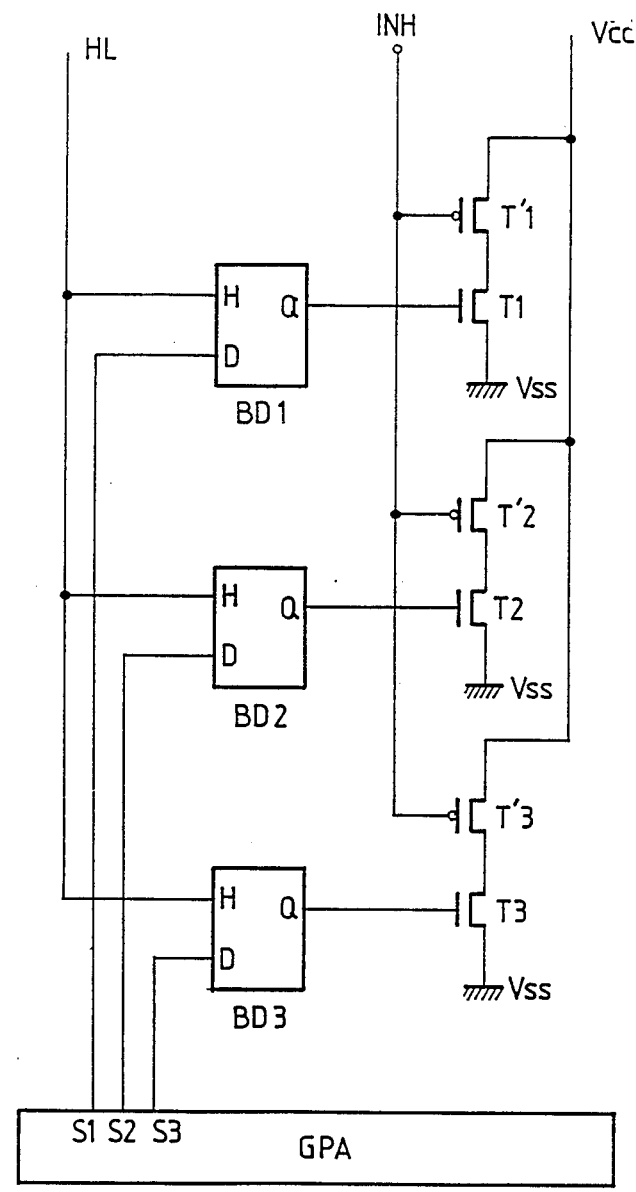
FIG. 1 is a block diagram of the protection circuit according to the invention.

The protection circuit according to the invention, shown in figure is made on the same integrated circuit substrate as the circuit to be protected, and it is supplied by the same Vcc (high level) and Vss (low level) supply terminals. It essentially comprises several simulation cells (three cells herein) controlled, through respective D-type flip-flops, BD1 for the first cell, BD2 for the second cell and BD3 for the third cell, by three outputs S1, S2, S3 of a pseudo-random sequences generator GPA.

Each simulation cell is designed to consume either a first current or a second current depending on the output logic level of the flip-flop that controls it. In the example shown, the essential element of the simulation cell is a transistor T1, T2, T3 respectively for each cell. This simulation transistor is connected between the supply terminals Vcc and Vss of the circuit, so that it consumes a current I or a zero current depending on the output level of the flip-flop that controls it.

However, as can be seen in the figure, provision has been made, preferably, for the transistor T1 to be in series with a transistor T'1 between Vcc and Vss, the transistor T2 to be in series with a transistor T'2, and the transistor T3 to be in series with a transistor T'3. The transistors T'1, T'2 and T'3 are inhibition transistors, all controlled by the same inhibition signal INH which enables controlling the instant when the protection signal has to effectively function: when the INH signal blocks the transistors T'1, T'2, T'3, the protection circuit no longer works. In the example shown, the inhibition transistors are of the P type while the simulation transistors are of the N type.

The simulation transistors are preferably given dimensions such that their consumption (current I) is substantially identically to the consumption of a memory cell of the circuit to be protected (not shown) at the time when this cell is read (if it is sought to protect the confidentiality of information during reading) or written (if it is sought to protect the confidentiality of information during writing).

If it is sought to protect a ROM against the reading of confidential information, and if the memory cells are formed by a transistor, the presence or absence of which defines the value 1 or 0 of the stored bit, the constitution and dimensions of the simulation transistors will preferably be identical to those of the transistors forming the memory cells.

If it is sought to protect the writing in an EPROM or EEPROM, the memory cells of which are floating gate transistors, the simulation transistors T1, T2, T3 will preferably be floating gate transistors, the control gate and floating gate of which are short-circuited. These transistors will also be dimensioned preferably like the transistors of the memory cells to be protected.

The current consumption of the cells is controlled by the outputs S1, S2, S3 of the generator of pseudo-random sequences which gives bits, at these outputs, that are randomly (in fact, pseudo-randomly) 0 or 1 bits.

However, the simulation transistors T1, T2, T3 are controlled through D-type flip-flops, BD1, BD2, BD3, controlled by a common clock HL which is preferably synchronized with the clocks that control the reading and writing sequences of the memory that it is sought to protect.

In this way, the pseudo-random bits generated at the outputs S1, S2, S3, are transmitted to the transistors only at the rising edge of this clock signal HL, i.e. at the instant when the current for reading or writing the memory cells to be protected will be consumed.

Figure 2:
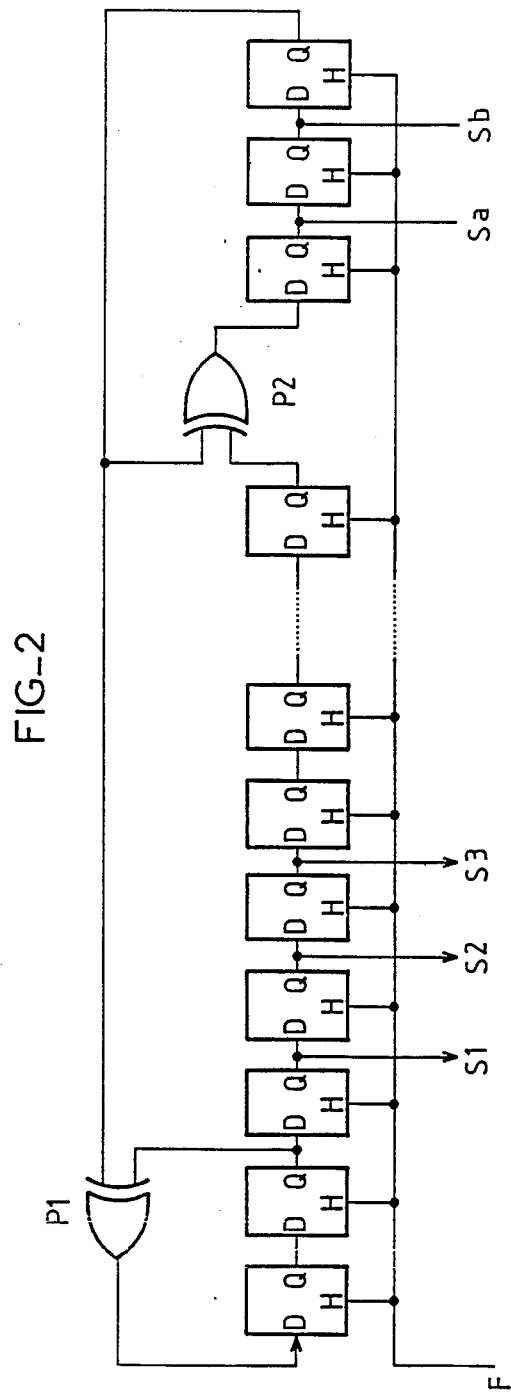
FIG. 2 shows an example of a pseudo-random sequences generator which can be used in the protection circuit according to the invention.

FIG. 2 shows an example of the possible constitution of a pseudo-random sequence generator.

This generator is formed by N cascade-mounted D-type flip-flops (the output of one of them being connected to the D input of the other), all controlled by one and the same clock signal with a frequency F. There is, moreover, provision for two loopings by means of two OR-EXCLUSIVE gates, respectively designated by P1 and P2: the input of the first flip-flop is formed by the output of the gate P1 which has, as its inputs, firstly, the output of the second flip-flop and, secondly, the output of the last flip-flop (N order flip-flop); secondly, the input of the N-3 order flip-flop is formed not by the output of the N-4 order flip-flop but by the output of the gate P2 which has, as its inputs, the output of the N-4 order flip-flop and the output of the last (N order) flip-flop.

The outputs of the pseudo-random generator are taken at the outputs of the D-type flip-flops. In the example shown, the outputs S1, S2, S3 are respectively the outputs of the third, fourth and fifth flip-flops.

For reasons which shall now be explained, there is also provision for two other outputs Sa and Sb giving pseudo-random bits. These outputs are the outputs of the order N-2 and order N-1 flip-flops, i.e. the two flip-flops that precede the last one of the series.

Figure 3:
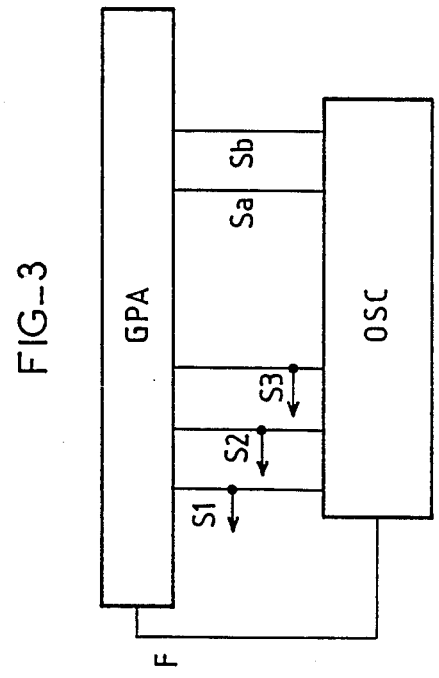
FIG. 3 is a block diagram indicating how the generator of pseudo-random sequences may be controlled by an oscillator, the frequency of which is itself controlled by outputs of the generator.

FIG. 3 shows the generator of pseudo-random sequences GPA associated with the oscillator OSC which delivers the frequency F of the clock signal of the generator.

The oscillator OSC is a controlled frequency oscillator. The frequency is controlled by a five-bit input signal. These five bits represent a pseudo-random sequence given by the generator GPA itself through its outputs S1, S2, S3, Sa Sb.

Thus, the frequency of the oscillator varies pseudo-randomly, so that the random character of the bits S1, S2, S3 is reinforced.

FIG. 4 gives an example of how to make the variable frequency oscillator OSC.

The oscillator includes a NOR gate, the output of which is connected to the input of a first inverter I1.

The output of the first inverter I1 is connected to the input of a second inverter I2, the output of which looped back to an input of the NOR gate. The other input of the NOR gate is used simply to receive a signal to inhibit the oscillator if it is desired to have this possibility of inhibition.

This looping of three inverting functions in cascade produces an oscillation, the frequency of which is adjusted by capacitors inserted, firstly, between the output of the NOR gate and a ground (Vss) and, secondly, between the output of the first inverter I1 and the ground.

Between the output of the NOR gate and the ground, there is provision for three parallel-mounted capacitors C1, C2 and Ca each of which, however, may be disconnected by a respective transistor in series with it. The respective transistors Q1, Q2, Qa are each controlled by a respective output S1, S2, Sa of the pseudo-random generator GPA.

In the same way, between the output of the inverter I1 and the ground Vss, there is provision for two parallel-mounted capacitors C3 and Cb which may each be disconnected by a respective transistor Q3, Qb in series with it. Q3 and Qb are each controlled by a respective output S3, Sb of the generator GPA.

Depending on the state of the bits S1, S2, S3, Sa, Sb, the frequency F will assume one of 32 possible values. The sequences of pseudo-random bits, present notably at the outputs S1, S2, S3, will be therefore produced at a frequency that itself varies randomly. This reinforces the random character of the bits produced at the outputs S1, S2, S3, hence the random character of the current consumption of the protection circuit according to the invention. We thus arrive at a very efficient level of protection against the detection of confidential information by the reading of the current consumed at the terminals of an integrated circuit during an operation for reading or writing this information.

What is claimed is:

1. A circuit for the protection of confidential data of a memory in integrated circuit form, said protection circuit comprising, on the same integrated circuit, several simulation cells capable of being controlled individually, these cells having two current consumption states that differ according to the signal that controls them, and a generator of pseudo-random sequences to control these cells, so that each of them is, pseudo-randomly, in one state or in another, thus making it more difficult to determine confidential information by reading the overall current consumption of the integrated circuit.

2. A protection circuit according to claim 1 wherein the cells, in both their states, consume currents substantially equal to those of the memory cells, the first state corresponding to the consumption of the memory cell in a 0 logic state and the second state corresponding to the consumption of the memory cell in a 1 logic state.

3. A protection circuit according to either of the claims 1 or 2, designed for the protection of a memory with respect to a reading of the stored information, wherein the simulation cells are formed essentially by a transistor identical to the transistors forming the cells of the memory.

4. A protection circuit according to either of the claims 1 or 2, designed for the protection of an EPROM or an EEPROM during the reading of confidential information, wherein each simulation cell is formed by a floating gate transistor, the floating gate and the control gate of which are short-circuited.

5. A protection circuit according to either of the claims 1 or 2, wherein the pseudo-random generator is is formed by a series of cascade-mounted flip-flops, certain outputs of the flip-flops being looped back to inputs through OR-Exclusive gates.

6. A protection circuit according to either of the claims 1 or 2, wherein the pseudo-random generator is controlled by a clock frequency, the variation of which is pseudo-random.

7. A protection circuit according to claim 6, comprising a controlled frequency oscillator having several frequency control inputs, these inputs being connected to outputs of the pseudo-random generator.

8. A protection circuit according to either of the claims 1 or 2, wherein each simulation cell is controlled by the output of a respective D-type flip-flop, each receiving, firstly, as inputs, a common clock signal and, secondly, a respective output of the pseudo-random generator.

9. A protection circuit according to either of the claims 1 or 2, wherein each simulation cell includes a transistor, and wherein this transistor is series-connected with an operation-inhibiting transistor between the supply terminals Vcc, Vss of the integrated circuit comprising the memory to be protected.

* * * * *